July 7, 1964     S. J. WENTHE     3,139,792

DISTANCE DETERMINING AND FIELD FRAMING DEVICE

Filed March 14, 1961

STEPHEN J. WENTHE
INVENTOR.

BY R. Frank Smith
F. M. Emerson Holmes

ATTORNEYS

United States Patent Office 3,139,792
Patented July 7, 1964

3,139,792
DISTANCE DETERMINING AND FIELD
FRAMING DEVICE
Stephen J. Wenthe, Rochester, N.Y., assignor to Eastman Kodak Company, Rochester, N.Y., a corporation of New Jersey
Filed Mar. 14, 1961, Ser. No. 95,652
3 Claims. (Cl. 88—24)

This invention relates to photographic apparatus and more particularly to distance determining and field framing devices for use with document copying apparatus.

As is well known in photographic copying, the distance between the object being copied and the film plane is a function of the focal length of the lens used in the copying camera and the magnification (sometimes called minification or reduction when the image is smaller than the object as is usual in document copying). When the lens used has a fixed focal length, the distance between the surface of the document being copied and the film plane is a function solely of the magnification desired.

In a common form of document copying apparatus, the document being copied is placed on a board or platen at one end of a track and the copying camera is placed at the other end of the track. The distance between the document surface and film plane is varied by moving either the platen or the camera along the track, depending on the design of the particular copying machine. This distance is usually measured by the use of a mechanical gauge such as a tape measure or some structure of fixed length which must be manually positioned by the operator and then removed to avoid having it appear in the photograph of the document.

My invention eliminates the need for such a mechanical gauge by providing a measuring device which projects two lines of light on the surface of the document being copied. At a predetermined distance of the measuring device from the surface the two lines merge into one. The device is so located with respect to the camera that the surface-to-film-plane distance is correct when the two lines merge. To set the distance all the operator has to do is move either the platen, or the camera and measuring device assembly, until the two lines of light merge into one on the surface being copied. Thus the copying apparatus is readily adapted to copy in succession documents of various thicknesses, as when books are being copied.

In known copying cameras, having a built-in exposure meter for indicating the photographic exposure necessary to make a good copy, the operator must either guess what part of the document is being read by the meter or else extend and then retract a manually operated indicator. My invention also provides lines of light to mark off the sides of the measuring field of an exposure meter, thus eliminating any manual operation for this purpose.

The primary object of my invention is, therefore, to provide a device for indicating a predetermined distance from the device to an object. Another object is to provide a device for setting the distance between a copying camera and the document to be copied. Still another object of the invention is to provide a visual indication of the field covered by an exposure meter used to judge the photographic exposure in a copying camera necessary for a good copy. Yet another object is to provide in photographic apparatus having light sensing means a device for indicating both the field measured by the sensing means and a predetermined distance from the device to the object to be photographed.

Figure 1:
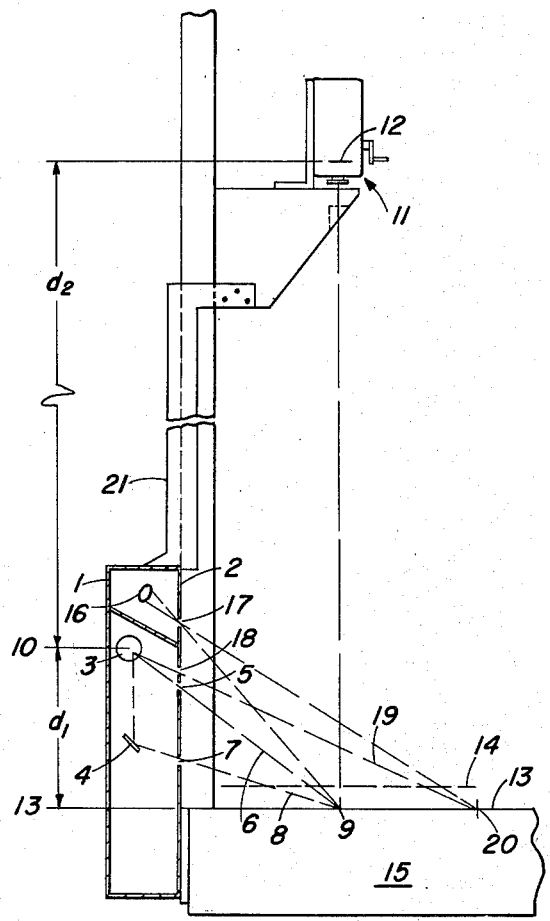
FIG. 1 is a schematic sectional view of a distance determining and field framing device embodying my invention.
Figure 2:
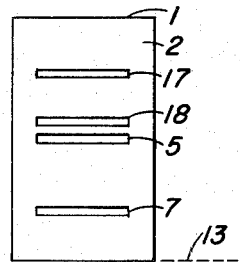
FIG. 2 is a front view of the device shown in FIG. 1.

Referring now to FIGS. 1 and 2 the device consists of a housing 1 of any suitable shape having a front wall 2. A light source 3 and fixed reflector 4 are mounted inside the housing at some distance apart with the reflector below the light source. A slit 5 in the wall 2 of the housing below the level of the source 3 directs a flat sheet of light 6 from the light source 3 downward toward the copying surface 13. Another slit 7, parallel to slit 5 and below it in the wall, and below the level of reflector 4, directs a sheet of light 8 from the reflector 4 downward toward the copying surface 13. The sheets of light 6 and 8, indicated by dashed lines in the diagram, are not parallel but will intersect in a line whose projection in the plane of the drawing is the point 9. The line of intersection may be made to fall at any convenient distance $d_1$ below the reference line 10 by a choice of the relative positions of the source 3, mirror 4, and slits 5 and 7. The distance $d_1$ is selected as a compromise between sensitivity of indication and accuracy of setting. If $d_1$ is made small, then the obliquity of the sheets is great and the indication is very sensitive to slight changes of distance, but the accuracy of setting is not as good as it could be because the projections of the lines on the sheet are rather wide and somewhat dim. The converse is true if $d_1$ is made very large, so that it should be selected as a suitable compromise between the two extremes.

The camera 11 is connected to the device by any suitable arrangement such as a rigid connecting bar 21 so that the two will move as a unit. Its film plane 12 is a distance $d_2$ above the reference line 10. The value of $d_2$ is determined by the fact that the sum $d_1+d_2$ must be equal to the required copy-surface-to-film-plane distance for the lens and magnification being used, as discussed above. The device may be adjusted to accommodate any lens focal length or magnification desired simply by moving the device upward or downward with relation to the camera until the sum $d_1+d_2$ is correct. If the copying camera is of the "autofocus" kind, the device may be coupled by any appropriate means to the autofocusing mechanism which controls the lens position, and the distance $d_2$ will then be set automatically to its proper value for any magnification chosen by the operator.

For example, in one widely used autofocus arrangement a long bar is connected to the lens focusing mechanism at one end and a long side of the bar (which may be either straight or have a cam curve on it) is urged into contact with a reference point which is fixed with respect to the document supporting means. Then as the camera is moved up or down the side of the bar remains in contact with the reference point and the mechanism is so arranged that it keeps the camera in focus. To use the device of the present invention with such an autofocus mechanism, it is only necessary to place the reference point on the device itself. Lens focus is then determined by the position of the camera with respect to the device rather than by the position of the camera with respect to the document supporting means. This method has the advantage of ready adaptability to an autofocus camera, and a disadvantage, minor in most cases, in that the magnification will vary slightly as the document thickness varies.

As can be seen from the drawing, if the surface to be copied is not at the correct level, for example the surface 14, the two sheets of light 6 and 8 will strike the surface at some distance from one another and will be visible to the operator as two separate lines of light on the surface. As the operator moves the surface relative to the device, either by moving the platen 15 or the device, the two lines of light will approach one another and will merge when the surface is at the correct position shown by 13.

Figure 3:
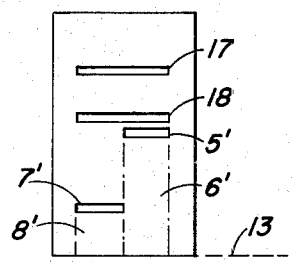
FIG. 3 is a similar front view of another embodiment of my invention.
Figure 4:
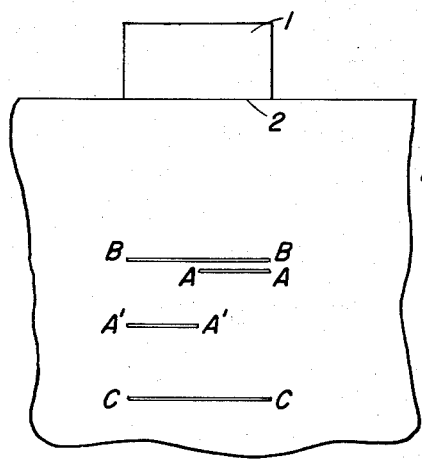
FIG. 4 is a plane view corresponding to FIG. 3 and showing what the operator sees on the object surface.

As an aid to the operator in determining the point at which the two lines of light merge, a modification, shown in FIG. 3, of the basic slit arrangement may be used. In FIG. 2 the two slits 5 and 7 were shown to be side by side. If now alternate halves of the slits are blocked to prevent the passage of light, as at 5' and 7' in FIG. 3, each sheet of light, 6' and 8', will be only half as wide as sheets 6 and 8 and the sheets 6' and 8' will not overlap. When the surface to be copied is at a wrong position, the operator will see a step formed by the two lines of light, as shown in FIG. 4, lines A—A and A'—A', and as the surface is moved to its correct position the step will decrease in height until at the correct position the two lines, which are juxtaposed endwise, appear to merge into one continuous straight line of light, line B—B in FIG. 4. Of course, the slits may be divided into more segments alternately transmitting and opaque, which will produce more steps on the surface and accentuate the indication, if that is desired.

Ordinarily, an exposure meter used for judging the correct photographic exposure measures the reflected light from only a part of the surface to be photographed and the exact area being measured is unknown. This is a handicap when the surface has large variations in its average reflectance from one part to another, or where it is important to photograph one part of the surface as well as possible without regard to other parts.

My device incorporates an exposure meter 16, FIG. 1, which is adapted to measure the light reflected from a particular part of the surface, between the points 9 and 20 in FIG. 1. Its field of view may be restricted to this part by any suitable means, for example, by the slot 17 in the wall 2. One edge of the exposure meter field is marked by the line of light, line C—C in FIG. 4, whose projection is 20, formed by the sheet of light 19 passing through the slot 18 and striking the surface. The other edge is marked by the intersection of the sheets 6 and 8, line B—B in FIG. 4. The lines C—C and B—B are made just long enough so that their ends indicate the sides of the field. The surface being copied may be moved about by the operator so that the part he wishes to have the best exposure lies within the area marked by the lines.

Thus it will be appreciated by those skilled in the art that the device of my invention provides a visual indication of the spacing of an object from the device by a predetermined distance and when used in conjunction with a photographic copying apparatus having a built-in exposure meter, provides a visual indication of both the field measured by the exposure meter and a predetermined distance from the device to the object to be photographed.

The invention has been described in detail with particular reference to preferred embodiments thereof, but it will be understood that variations and modifications can be effected within the spirit and scope of the invention as described hereinabove and as defined in the appended claims.

I claim:
1. Document copying apparatus comprising:
   easel means for supporting a document in an approximately horizontal position, the terms horizontal and vertical being used herein relative to each other and not necessarily defining orientation relative to the earth,
   a fixed focus camera focused on a plane at a fixed distance from the camera,
   rigid means for supporting said camera vertically above and facing said easel to receive light from a document thereon,
   means for coupling said easel means and said rigid means and for vertically adjusting them relative to each other,
   wall means carried by said rigid means to one side of the path of said light and having a plurality of horizontal slits above said easel, and
   lamp means also carried by said rigid means for sending flat sheets of light through two of said slits obliquely to the said easel, said lamp means and slits being so positioned that said two sheets intersect in a single line at the plane of fixed focus of said camera.
2. Apparatus according to claim 1 wherein said two slits are located so that said two sheets are juxtaposed and approximately touch at said single line of intersection.
3. Document copying apparatus according to claim 1,
   having light sensing means also carried by said rigid means to one side of the path of said light received by the camera for also receiving light from a portion of a document on said easel means,
   the line of intersection of said two sheets being approximately at one edge of said portion when the document is in said plane of fixed focus, and
   said wall means having a third horizontal slit positioned to transmit a third sheet of light from said lamp means to intersect the document approximately at the other edge of said portion when the document is in said plane of fixed focus.

References Cited in the file of this patent

UNITED STATES PATENTS

| | | |
|---|---|---|
| 2,286,977 | Richards | June 16, 1942 |
| 2,312,261 | Mills | Feb. 23, 1943 |
| 2,428,627 | Kalman | Oct. 7, 1947 |
| 2,595,495 | Von Berg et al. | May 6, 1952 |
| 2,851,919 | Nesvadba | Sept. 16, 1958 |
| 2,906,164 | Dresser | Sept. 29, 1959 |
| 2,952,780 | Rogers | Sept. 13, 1960 |

FOREIGN PATENTS

| | | |
|---|---|---|
| 860,453 | Germany | Dec. 22, 1952 |
| 942,848 | Germany | May 9, 1956 |
| 790,475 | Great Britain | Feb. 12, 1958 |